(12) United States Patent
Allen et al.

(10) Patent No.: US 11,932,360 B2
(45) Date of Patent: Mar. 19, 2024

(54) TUNED MASS DAMPER FOR FLOATING STRUCTURES

(71) Applicant: University of Maine System Board of Trustees, Orono, ME (US)

(72) Inventors: Christopher K. Allen, Bangor, ME (US); Anthony M. Viselli, Bangor, ME (US); Andrew J. Goupee, Ellsworth, ME (US); Habib J. Dagher, Veazie, ME (US); Robert E. Berry, Madison, AL (US); Jeffrey L. Lindner, Madison, AL (US); Frederick S. Gant, Huntsville, AL (US); John S. Townsend, Union Grove, AL (US); Rebecca L. Williams, Huntsville, AL (US)

(73) Assignee: University of Maine System Board of Trustees, Orono, ME (US)

( * ) Notice: Subject to any disclaimer, the term of this patent is extended or adjusted under 35 U.S.C. 154(b) by 505 days.

(21) Appl. No.: 17/290,518

(22) PCT Filed: Nov. 4, 2019

(86) PCT No.: PCT/US2019/059628
§ 371 (c)(1),
(2) Date: Apr. 30, 2021

(87) PCT Pub. No.: WO2020/093037
PCT Pub. Date: May 7, 2020

(65) Prior Publication Data
US 2021/0387702 A1 Dec. 16, 2021

Related U.S. Application Data

(60) Provisional application No. 62/754,699, filed on Nov. 2, 2018.

(51) Int. Cl.
*B63B 39/03* (2006.01)
*B63B 35/44* (2006.01)
(Continued)

(52) U.S. Cl.
CPC .............. *B63B 39/03* (2013.01); *B63B 35/44* (2013.01); *B63B 39/02* (2013.01); *B63B 79/15* (2020.01);
(Continued)

(58) Field of Classification Search
CPC ....... B63B 39/00; B63B 39/005; B63B 39/02; B63B 39/03; B63B 35/00; B63B 35/44;
(Continued)

(56) References Cited

U.S. PATENT DOCUMENTS 3,635,182 A  1/1972  Paffett
3,678,877 A  7/1972  Csupor
(Continued)

FOREIGN PATENT DOCUMENTS

CL    197800808    12/1978
CL       33806      6/1983
(Continued)

OTHER PUBLICATIONS

Chilean Office Action, Application No. 202101146, dated Feb. 13, 2023.
(Continued)

*Primary Examiner* — Daniel V Venne
(74) *Attorney, Agent, or Firm* — MacMillan, Sobanski & Todd, LLC (57) ABSTRACT

A tuned mass damper (TMD) system in combination with a floating offshore wind turbine (FOWT) platform includes a barge type FOWT platform having a hull configured to have a wind turbine tower mounted thereon. A TMD system is mounted in the hull and has a first TMD configured to
(Continued)

operate at a first frequency, and a second TMD configured to operate at a second frequency different than the first frequency.

18 Claims, 6 Drawing Sheets

(51) Int. Cl.
  *B63B 39/02* (2006.01)
  *B63B 79/15* (2020.01)
  *F03D 13/25* (2016.01)
(52) U.S. Cl.
  CPC ........ *F03D 13/25* (2016.05); *B63B 2035/446* (2013.01); *F05B 2240/93* (2013.01); *F05B 2240/95* (2013.01); *F05B 2260/964* (2013.01)
(58) Field of Classification Search
  CPC ...... B63B 2035/4433; B63B 2035/446; B63B 79/15; B63B 1/107; F03B 2240/93; F03B 2240/95; F03B 2260/964; F03D 13/25; Y02E 10/72; Y02E 10/727
  USPC ................................ 114/121, 122, 124, 125
  See application file for complete search history.

(56) References Cited

U.S. PATENT DOCUMENTS

| | | | |
|---|---|---|---|
| 4,226,554 | A | 10/1980 | Vandiver et al. |
| 8,057,127 | B2 | 11/2011 | Lopez et al. |
| 8,123,484 | B2* | 2/2012 | Choi ...................... F03D 80/00 416/244 R |
| 9,446,822 | B2 | 9/2016 | Roddier et al. |
| 9,518,564 | B2 | 12/2016 | Dagher et al. |
| 9,657,717 | B2 | 5/2017 | Ollgaard et al. |
| 10,018,186 | B2* | 7/2018 | Bergua ...................... F03D 1/00 |
| 10,087,915 | B1 | 10/2018 | Srinivasan |
| 10,569,844 | B2 | 2/2020 | Gilloteaux et al. |
| 10,683,065 | B2 | 6/2020 | Lepreux et al. |
| 11,118,646 | B2* | 9/2021 | Jiang ...................... F03D 13/25 |
| 11,279,452 | B2* | 3/2022 | Allen ...................... B63B 35/44 |
| 2010/0288178 | A1 | 11/2010 | Mansour |
| 2011/0037264 | A1 | 2/2011 | Roddier et al. |
| 2012/0121413 | A1 | 5/2012 | Tsouroukdissian |
| 2014/0079548 | A1 | 3/2014 | Tsouroukdissian |
| 2014/0339828 | A1 | 11/2014 | Peiffer et al. |

FOREIGN PATENT DOCUMENTS

| | | |
|---|---|---|
| CL | 2013001239 A1 | 10/2014 |
| CL | 2016000674 A1 | 10/2016 |
| CL | 201702665 | 10/2017 |
| CN | 202783720 U | 3/2013 |
| CN | 103758705 A | 4/2014 |
| CN | 103786837 A | 5/2014 |
| JP | 2016519247 A | 6/2016 |
| JP | 2019508313 A | 3/2019 |
| WO | 2014184454 A1 | 11/2014 |
| WO | 2016172149 A1 | 10/2016 |
| WO | 2017009943 A1 | 1/2017 |

OTHER PUBLICATIONS

Zhang et al., "Vibration control of floating offshore wind turbines using liquid column dampers", Journal of Physics: Conference Series 1037: The Science of Making Torque from Wind (Torque), 2018, pp. 1-11.
He et al., "Optimization design of tuned mass damper for vibration suppression of a barge-type offshore floating wind turbine", Journal of Engineering for the Maritime Environment, 2017, vol. 23, Issue 1, pp. 302-315.
Tong et al., "Passive vibration control of an offshore floating hydrostatic wind turbine model", Wind Energy 2018, pp. 1-22.
Ding et al., "Study on TMD Control on Stability Improvement of Barge- Supported Floating Offshore Wind Turbine Based on the Multi-Island Genetic Algorithm", China Ocean Engineering, 2019, vol. 33, No. 3, pp. 309-321.
Namik et al., "A Review of Floating Wind Turbine Controllers", Handbook of Wind Power Systems, Energy Systems, 2013, pp. 415-441.
The Extended European Search Report, Application No. 19878104.9, dated Jul. 6, 2022.
Chilean Office Action, Application No. 202101146, dated Aug. 8, 2022.
Intellectual Property of India, Examination Report under sections 12 & 13 of the Patents Act, 1970 and the Patents Rules, 2003, Application No. 202147023222, dated Oct. 13, 2022.
Brazilian Office Action, Application No. BR 11 2021 008494 0, dated Jun. 27, 2023.
The Partial European Search Report, Application No. 22171757.2, dated Oct. 27, 2022.
PCT International Search Report and Written Opinion, Application No. PCT/US19/59628, dated Apr. 20, 2020.
Zhang et al., "Vibration control of floating offshore wind turbines using liquid col. dampers", Journal of Physics: Conf. Series 1037, 2018, pp. 1-11.
He et al., "Optimization design of tuned mass damper for vibration suppression of a barge-type offshore floating wind turbine", Journal of Engineering For The Maritime Environment, 2017, vol. 231, No. 1, pp. 302-315.
Ding et al., "Study on TMD Control on Stability Improvement of Barge-Supported Floating Offshore Wind Turbine Based on the Multi-Island Genetic Algorithm", Chinese Ocean Engineering, 2019, vol. 33, No. 3, pp. 309-321.
Stol et al., "A Review of Floating Wind Turbine Controllers", Handbook of Wind Power Systems, 2015, pp. 415-441.
Japanese Office Action, Application No. JP 2021-523898, dated Jun. 4, 2022.
Intellectual Property India, Indian Examination Report, Application No. 202348016063, dated Apr. 27, 2023.

* cited by examiner

FIG. 9

TUNED MASS DAMPER FOR FLOATING STRUCTURES

BACKGROUND

This invention relates in general to floating platforms. In particular, this invention relates to an improved floating offshore wind turbine (FOWT) platform having an improved tuned mass damper system to reduce motion and loading resulting from wind, current, and wave loading during operation.

Wind turbines for converting wind energy to electrical power are known and provide an alternative energy source for power companies. On land, large groups of wind turbines, often numbering in the hundreds of wind turbines, may be placed together in one geographic area. These large groups of wind turbines can generate undesirably high levels of noise and may be viewed as aesthetically unpleasing. An optimum flow of air may not be available to these land-based wind turbines due to obstacles such as hills, woods, and buildings.

Groups of wind turbines may also be located offshore, but near the coast at locations where water depths allow the wind turbines to be fixedly attached to a foundation on the seabed. Over the ocean, the flow of air to the wind turbines is not likely to be disturbed by the presence of various obstacles (i.e., as hills, woods, and buildings) resulting in higher mean wind speeds and more power. The foundations required to attach wind turbines to the seabed at these near-coast locations are relatively expensive, and can only be accomplished at relatively shallow depths, such as a depth of up to about 45 meters.

The U.S. National Renewable Energy Laboratory has determined that winds off the U.S. Coastline over water having depths of 30 meters or greater have an energy capacity of about 3,200 TWh/yr. This is equivalent to about 90 percent of the total U.S. energy use of about 3,500 TWh/yr. The majority of the offshore wind resource resides between 37 and 93 kilometers offshore where the water is over 60 meters deep. Fixed foundations for wind turbines in such deep water are likely not economically feasible. This limitation has led to the development of floating platforms for wind turbines. Known floating wind turbine platforms may be anchored to the seabed with mooring lines and provide some stability to the tower and turbine against external loading from wind, waves, and current, as well as loading associated with the dynamics of the wind turbine mounted thereon. Floating wind turbine platforms and the tower and turbine mounted thereon however, may still experience undesirable instability due to external loading from the wind, waves, and current.

It would be desirable therefore to provide a FOWT platform with an improved tuned mass damper system to reduce motion and loading resulting from wind, current, and wave loading during operation.

SUMMARY OF THE INVENTION

This invention relates to an improved tuned mass damper (TMD) system in combination with a floating offshore wind turbine (FOWT) platform configured to reduce motion and loading during operation of the FOWT platform. The improved TMD system in combination with a FOWT platform includes a barge type FOWT platform having a hull configured to have a wind turbine tower mounted thereon. A TMD system is mounted in the hull and has a first TMD configured to operate at a first frequency, and a second TMD configured to operate at a second frequency different than the first frequency.

A second embodiment of the TMD system in combination with a FOWT platform includes a FOWT platform having a center, at least three legs extending radially from the center, and configured to have a wind turbine tower mounted thereon. A TMD system, a portion of which is mounted in each of the legs is provided. Each leg has a first TMD at an outboard end of each leg configured to operate at a first frequency, and a second TMD at an inboard end of each leg configured to operate at a second frequency different than the first frequency.

A third embodiment of a TMD system configured for use in a FOWT platform includes a buoyant base having a tower extending outwardly and upwardly therefrom, the tower configured to have a wind turbine mounted thereon, and a TMD mounted in the base. The base includes a pressure chamber formed within the base, the pressure chamber connected to a source of pressurized air and having an air pressure greater than atmospheric pressure. An orifice damper is formed in the pressure chamber, and a flexible and water-impermeable diaphragm is mounted between the pressure chamber and the body of water in which the FOWT platform is deployed, the water urging against the diaphragm defining a mass of the TMD.

A fourth embodiment of a TMD system in combination with a FOWT platform includes a semi-submersible type FOWT platform having a center, at least three legs extending radially from the center, a center column, an outer column at a distal end of each of the at least three legs, is configured to have a wind turbine tower mounted on the center column, and a TMD system mounted in the FOWT platform. The TMD system includes a horizontally oriented first TMD mounted in each of the legs, and a vertically mounted second TMD mounted in each of the columns. The first TMDs in each leg include a first water ballast chamber that defines a mass of the first TMD, and the second TMDs in each column include a second water ballast chamber that defines a mass of the second TMD. Each of the first and the second TMDs may be configured to operate at a different frequency.

Various aspects of this invention will become apparent to those skilled in the art from the following detailed description of the preferred embodiment, when read in light of the accompanying drawings.

DETAILED DESCRIPTION OF THE PREFERRED EMBODIMENT

The present invention will now be described with occasional reference to the illustrated embodiments of the invention. This invention may, however, be embodied in different forms and should not be construed as limited to the embodiments set forth herein, nor in any order of preference. Rather, these embodiments are provided so that this disclosure will be more thorough, and will convey the scope of the invention to those skilled in the art.

The embodiments of the invention disclosed below generally provide improvements to various types of floating offshore wind turbine (FOWT) platforms, such as barge type platforms, submersible or semi-submersible type platforms, spar buoy type platforms, and tension leg type platforms. The invention includes a FOWT platform with an improved tuned mass damper system to reduce motion and loading during operation.

As used herein, the term parallel is defined as in a plane substantially parallel to the horizon. The term vertical is defined as substantially perpendicular to the plane of the horizon.

Figure 1:
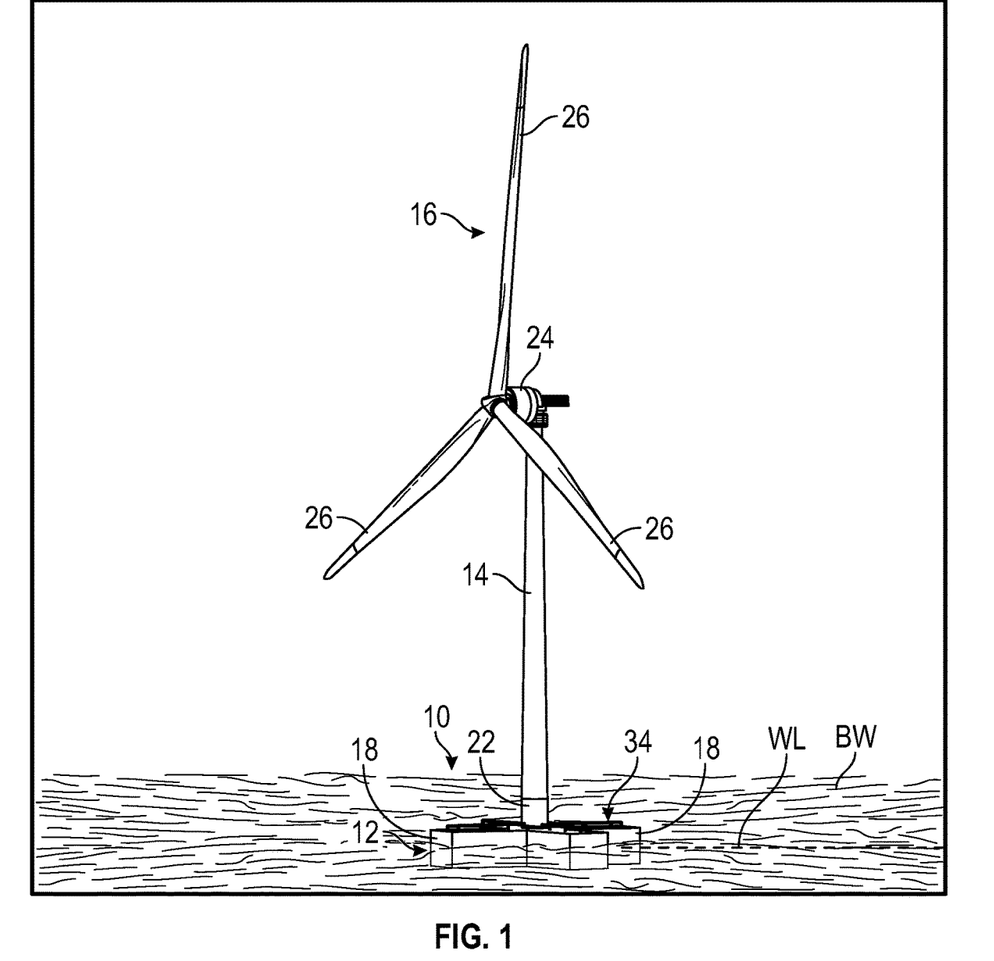
FIG. 1 is a perspective view of a FOWT platform with a wind turbine mounted thereon and having an improved tuned mass damper (TMD) system in accordance with this invention.
Figure 2:
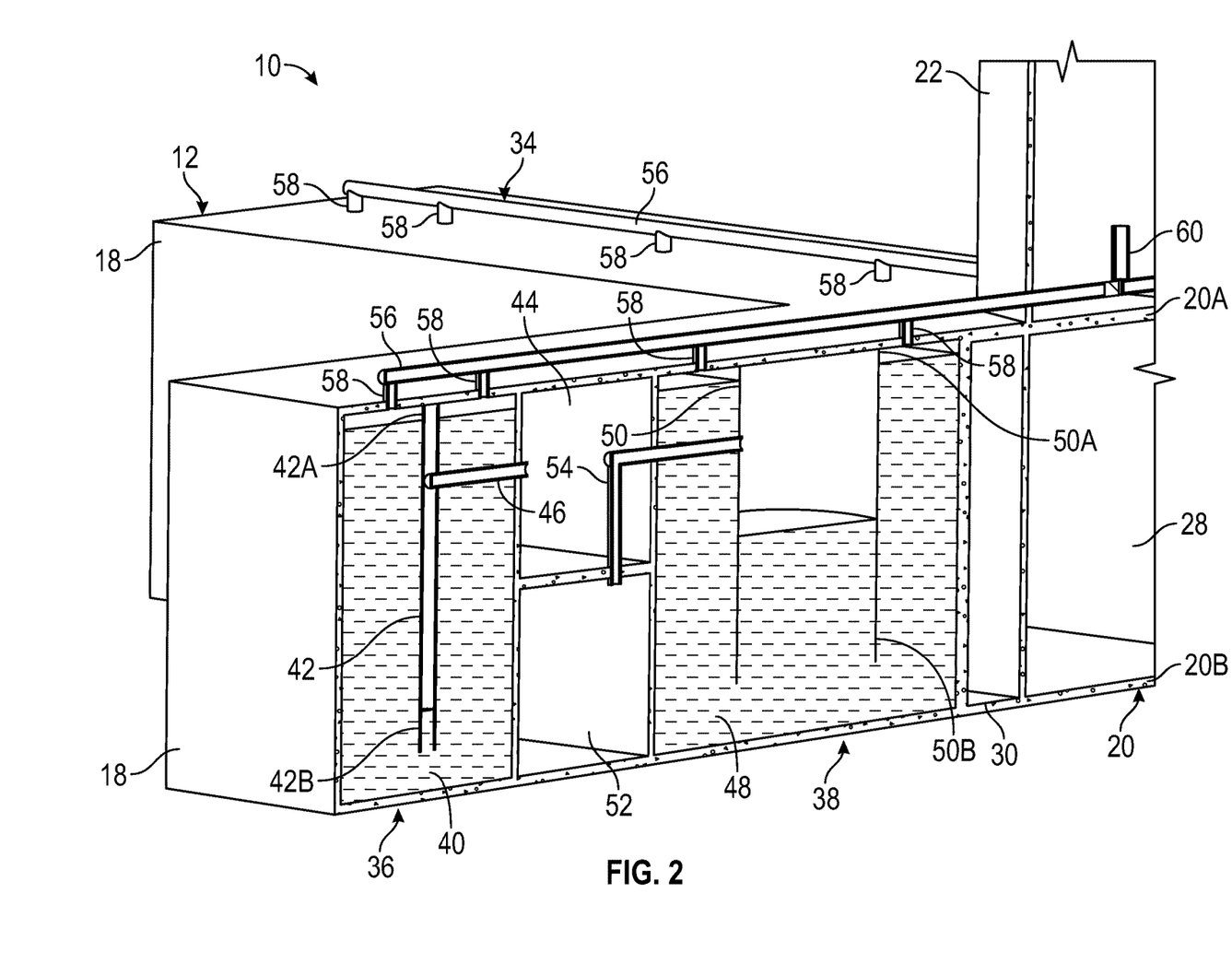
FIG. 2 is an enlarged view of a portion of the FOWT platform illustrated in FIG. 1, partially in cross-section.
Figure 3:
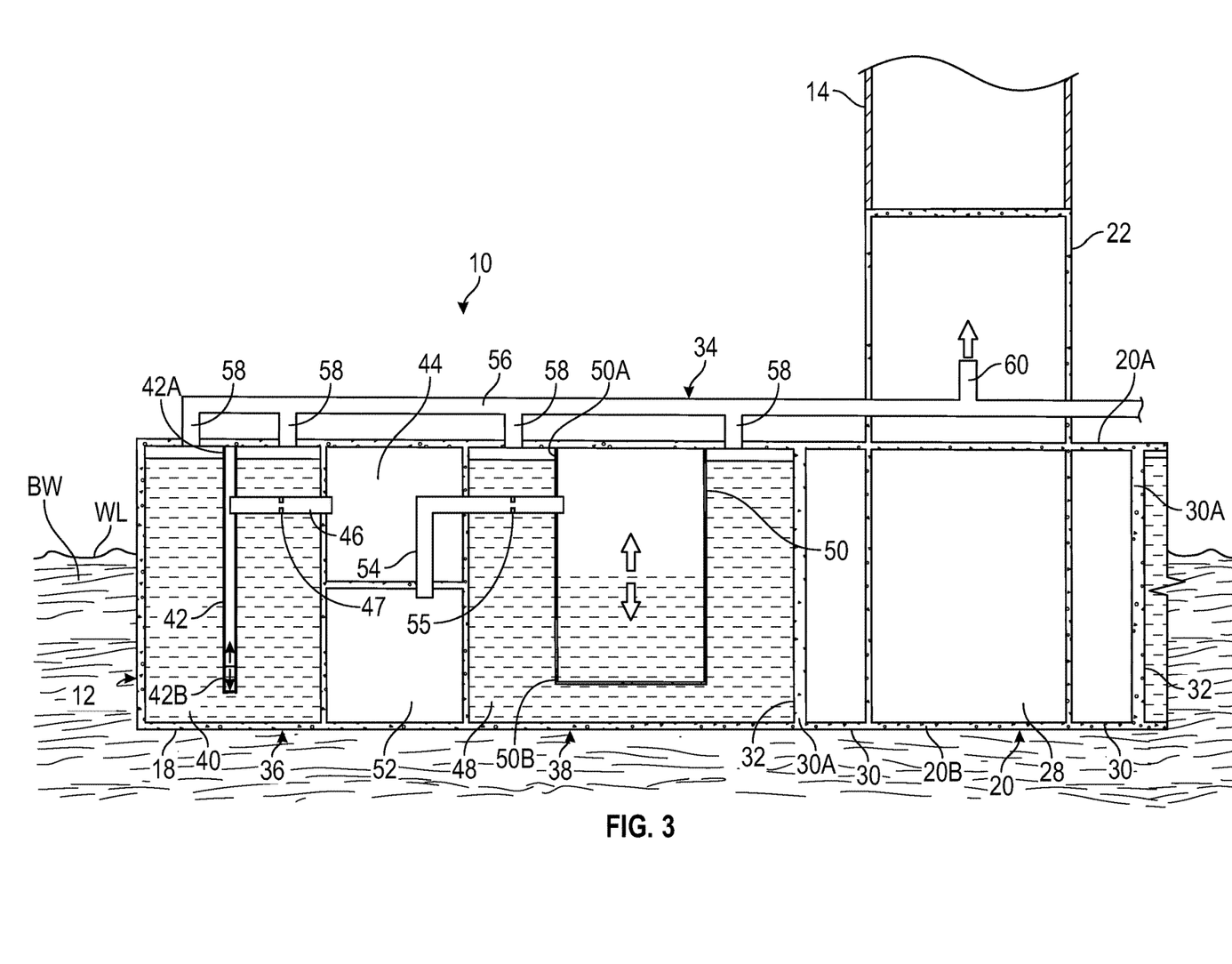
FIG. 3 is an alternate cross-sectional view of the FOWT platform illustrated in FIGS. 1 and 2.

Referring to the drawings, particularly to FIGS. 1 through 3, a first embodiment of a FOWT platform 10 having an improved tuned mass damper (TMD) system 34 is shown deployed in a body of water BW and anchored to the seabed (not shown). The illustrated FOWT platform 10 is one embodiment of a barge type platform and includes a foundation or hull 12 that supports a tower 14. The tower 14 supports a wind turbine 16. The hull 12 is semi-submersible, and is structured and configured to float, semi-submerged, in the body of water BW. Accordingly, a portion of the hull 12 will be above water when the hull 12 is floating in the body of water BW. As shown, a portion of the hull 12 is below the waterline WL. As used herein, the waterline WL is defined as the approximate line where the surface of the water meets the FOWT platform 10. Conventional mooring lines (not shown) may be attached to the FOWT platform 10 and further attached to anchors (not shown) in the seabed (not shown) to limit to movement of the FOWT platform 10 on the body of water BW.

As shown in the illustrated embodiment, the hull 12 is formed from four hull legs 18 that extend radially outwardly from a keystone 20 and provide buoyancy. The hull 12 is thus substantially cross-shaped. An interior or center column 22 is mounted to the keystone 20, and provides a platform upon which the tower 14 is mounted. Alternatively, the hull 12 may include three hull legs 18 or more than four hull legs 18. In the illustrated embodiment, the hull legs 18 have a length within the range of about 10 m to about 75 m depending on the size of commercial wind turbine installed.

Although the hull 12 of the barge type FOWT platform 10 is cross shaped, it will be understood that the improved TMD system 34 may be used in barge type platforms having other hull shapes, including but not limited to hulls having rectangular, square, round, oval, and other geometric shapes.

In the embodiments illustrated herein, the wind turbine 16 is a horizontal-axis wind turbine. Alternatively, the wind turbine may be a conventional vertical-axis wind turbine (not shown). The size of the turbine 16 will vary based on the wind conditions at the location where the FOWT platform 10 is anchored and the desired power output. For example, the turbine 16 may have an output of about 10 MW. Alternatively, the turbine 16 may have an output within the range of from about 1 MW to about 20 MW.

The wind turbine 16 may be conventional and may include a rotatable hub 24. At least one rotor blade 26 is coupled to and extends outward from the hub 24. The hub 24 is rotatably coupled to an electric generator (not shown). The electric generator may be coupled via a transformer (not shown) and an underwater power cable (not shown) to a power grid (not shown). In the illustrated embodiment, the hub 24 has three rotor blades 26. In other embodiments, the hub 24 may have more or less than three rotor blades 26.

As shown in FIGS. 2 and 3, the keystone 20 includes an upper wall 20A defining an upper surface, a lower wall 20B, and further defines a central cavity 28 with four radially outwardly extending keystone legs 30. Each leg 30 includes an end wall 30A defining a substantially vertical connection face 32 to which the four hull legs 18 will be attached. Alternatively, the keystone 20 may include three keystone legs 30 or more than four keystone legs 30, corresponding with the number of hull legs 18.

A conventional TMD is a mechanism integrated with a dynamic body that uses an internal or external mass and is linked to the dynamic body via a spring and a damper. The damper is used to reduce unwanted responses in the dynamic body by setting the damper to respond out of phase and at the frequency of the unwanted response, a procedure typically referred to as a tuned mass damping. The natural frequency of the TMD may be tuned by selecting a combination of mass and stiffness for the connection between the damper and the dynamic body. The phase of the damper may be tuned by adjusting the damping in the linkage between the mass damper and the dynamic body. Advantageously, the embodiments of the TMD described and illustrated herein use existing water in water ballast chambers in the hull, for example in the hull legs 18 or water external to the hull legs 18, as the mass, pressurized air as the spring, and an orifice configured for tuned damping.

The improved TMD system 34, illustrated in FIGS. 1 through 3, includes a first or low frequency TMD 36 and a second or high frequency TMD 38. The low frequency TMD 36 is formed at an outboard end of each of the hull legs 18 and includes a first water ballast chamber 40 having a centrally located and longitudinally extending first damper pipe 42 extending from an upper end of the first water ballast chamber 40 toward a lower end of the first water ballast chamber 40, but terminating above a floor of the first water ballast chamber 40. The first damper pipe 42 may have a diameter within the range of about 1 m to about 20 m, a closed first end 42A (the upper end when viewing FIGS. 2 and 3), and an open second end 42B (the lower end when viewing FIGS. 2 and 3). A low frequency pressure chamber 44 is located in the hull leg 18. In the illustrated embodiment, the low frequency pressure chamber 44 is located adjacent the first water ballast chamber 40. Alternatively, the low frequency pressure chamber 44 may be located at other desired locations in the hull leg 18. A first connecting pipe 46 extends between the low frequency pressure chamber 44 and an upper portion of the first damper pipe 42.

Similarly, the high frequency TMD 38 is formed at an inboard end of each of the hull legs 18 and includes a second water ballast chamber 48 having a centrally located and longitudinally extending second damper pipe 50 extending from an upper end of the toward a lower end of the second water ballast chamber 48, but terminating above a floor of the second water ballast chamber 48. The second damper pipe 50 may have a diameter significantly larger than the diameter of the first damper pipe 42, such as within the range of about 1 m to about 20 m, a closed first end 50A (the upper end when viewing FIGS. 2 and 3), and an open second end 50B (the lower end when viewing FIGS. 2 and 3). A high frequency pressure chamber 52 is also located in the hull leg 18. In the illustrated embodiment, the high frequency pressure chamber 52 is located adjacent the second water ballast chamber 48 and below the first water ballast chamber 40. Alternatively, the high frequency pressure chamber 52 may be located at other desired locations in the hull leg 18. A second connecting pipe 54 extends between the high frequency pressure chamber 52 and an upper portion of the second damper pipe 50.

A ventilation pipe 56 is mounted to an upper, outside surface of each hull leg 18. Each ventilation pipe 56 has a plurality of connecting ventilation pipes 58 connecting each of the first water chambers 40 and the second water chambers 48, and each ventilation pipe 56 terminates at an open end thereof within the center column 22. In the illustrated embodiment, two connecting ventilation pipes 58 are connected to, and in communication with, each of the first water chambers 40 and the second water chambers 48. Inboard ends of the ventilation pipes 56 are connected to a central vent hub 60 within the center column 22. The ventilation pipes 56 and connecting ventilation pipes 58 vent each of the first water chambers 40 and the second water chambers 48 to the atmosphere.

Air pressure within the low frequency pressure chamber 44 and the high frequency pressure chamber 52 may be within the range of about 1.0 psi to about 50.0 psi, although preferably, the air pressure within the high frequency pressure chamber 52 is greater than the air pressure within the low frequency pressure chamber 44. The air pressure within each of the low frequency pressure chamber 44 and the high frequency pressure chamber 52 is customizable, and may be set and changed by an air compressor (not shown) within the FOWT platform 10.

The first water chambers 40 and the second water chambers 48 may be in fluid communication with a ballast pump (not shown) or other means for pumping or moving water, thus allowing the first water chambers 40 and the second water chambers 48 to be filled with water, and for the volume of water therein to be changed as required.

The first connecting pipe 46 and the second connecting pipe 54 may be provided with adjustable orifices, schematically illustrated at 47 and 55, respectively, within each of the first connecting pipe 46 and the second connecting pipe 54. Inside diameters of the adjustable orifices 47 and 55 may adjusted as required, i.e., either made larger or smaller, for active control of the flow of pressurized air from the low frequency pressure chamber 44 to the first damper pipe 42, and from the high frequency pressure chamber 52 to the second damper pipe 50. The adjustable orifices 47 and 55 may be manually or remotely adjusted. Thus, a desired frequency may be maintained within the low frequency TMD 36 and the high frequency TMD 38. For example, the frequency within the low frequency pressure chamber 44 and the high frequency pressure chamber 52 is preferably within the range of about 0.03 Hz to about 0.33 Hz. Preferably, a frequency of the high frequency TMD 38 is greater than a frequency of the low frequency TMD 36. Thus the damping characteristics of the high frequency TMD 38 and the low frequency TMD 36 may be controlled and adjusted by changing the rate of air flow through the second connecting pipe 54 and the first connecting pipe 46, respectively.

More specifically, the TMDs 36 and 38 may each be actively controlled to mitigate the adverse effects of FOWT platform motion and loading resulting from wind, current, and wave loading during operation over a range of frequencies.

For example, the TMD system 34 may be provided with a controller mounted at any desired location in the FOWT platform 10. Preferably, a controller provided as a component of the wind turbine 16 is used as the TMD 34 controller. It will be understood however, that the controller used to control operation of the TMD system 34 may be independent of the wind turbine 16 controller.

Referring again to FIG. 3, the adjustable orifices 47 and 55 may be equipped with a sensor, such as a position sensor, configured to sense the size of the orifices 47 and 55 during operation, and communicate the sensed position to the controller. Alternatively, other types of sensors may be used, including but not limited to a fluid flow sensor to measure fluid flow through the orifices 47 and 55 during operation, and communicate the sensed fluid flow to the controller. Each of the low frequency pressure chamber 44 and the high frequency pressure chamber 52 may be equipped with a pressure sensor configured to sense the air pressure in the pressure chambers 44 and 52 during operation, and communicate the sensed pressures to the controller.

Further, the hull 12 may include an array of sensors configured to sense a change of sea state and communicate the sensed sea state change to the controller. Examples of sea state sensors that may be provided on the hull 12 include, but are not limited to accelerometers, inclinometers and other angular position sensors, and load cells. Data from this array of sea state change sensors is communicated to the controller. An algorithm within the controller analyzes the data received and then: (1) changes a stiffness of the TMDs 36 and 38 by changing the air pressure in the pressure chambers 44 and 52, respectively, and/or (2) changes a damping frequency of the TMDs 36 and 38 by changing the size of the orifices 47 and 55, respectively, thus changing a volume of air flow through the first connecting pipe 46 and the second connecting pipe 54.

In operation, each of the low frequency TMD 36 and the high frequency TMD 38 may be tuned based on the geometry of the FOWT hull and the desired frequencies for which it is desirable to mitigate. Advantageously, the TMD system 34 of the FOWT platform 10 may be used to mitigate motions at two or more frequencies. As best shown in FIG. 3, a desired air pressure may be established in the low frequency pressure chamber 44 of the low frequency TMD 36. This desired air pressure will be communicated to the first damper pipe 42 via the first connecting pipe 46 and thus determines a level of water within the first damper pipe 42. The water in the first damper pipe 42 urges against the pressurized air in the first damper pipe 42, and thus acts like a spring. Because the low frequency TMD 36 is formed at an outboard end of each of the hull legs 18, and is oriented vertically, it provides greater leverage and is more effective to mitigate heeling, or the reduction of rotational movement of the hull 12.

Similarly, a desired air pressure may be established in the high frequency pressure chamber 52 of the high frequency TMD 38. This desired air pressure will be communicated to the second damper pipe 50 via the second connecting pipe 54 and thus determines a level of water within the second damper pipe 50. The water in the second damper pipe 50 urges against the pressurized air in the second damper pipe 50, and thus acts like a spring. Because the high frequency TMD 38 is formed at an inboard end of each of the hull legs 18, and is oriented vertically, it is more effective to mitigate up and down motion, i.e., vertical motion of the hull 12.

Figure 4:
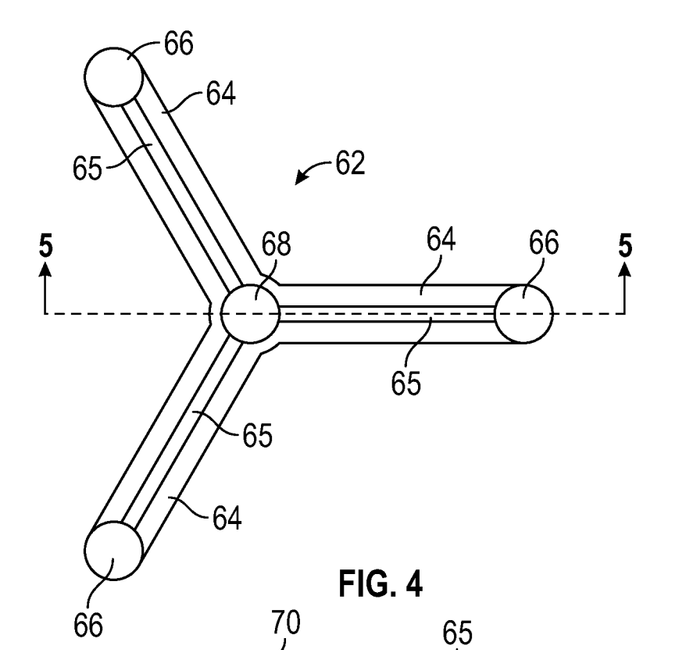
FIG. 4 is a top plan view of a semi-submersible FOWT platform having a second embodiment of the improved TMD system in accordance with this invention.
Figure 5:
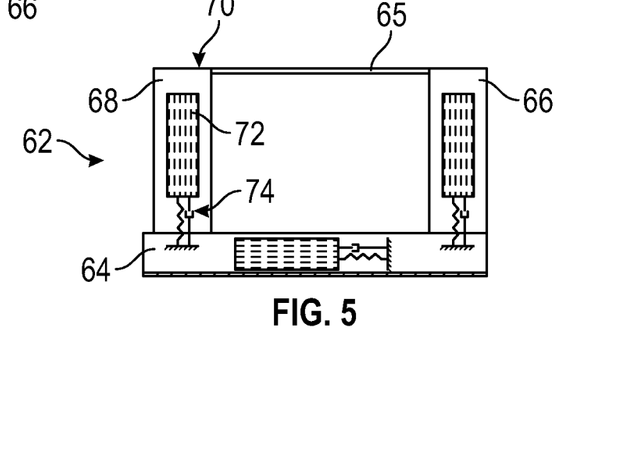
FIG. 5 is a cross-sectional view taken along the line 5-5 of FIG. 4.

FIGS. 4 and 5 illustrate a semi-submersible FOWT platform 62 having a second embodiment of the improved TMD system, shown schematically at 70. The semi-submersible FOWT platform 62 includes three buoyant beams 64, a vertical outer column 66 at an outboard end of each of the beams 64 and a vertical center column 68 at a center of the FOWT platform 62. Upper beams 65 may extend between an upper end of the center column 68 and an upper end of each of the outer columns 66. As illustrated in FIG. 5, the TMD system 70 includes a water chamber 72 and a pressure chamber having an orifice damper 74. In the illustrated embodiment, each of the beams 64 has a horizontally oriented TMD system 70 therein, and each of the columns, 66 and 68 has a vertically oriented TMD system 70 therein.

Figure 6:
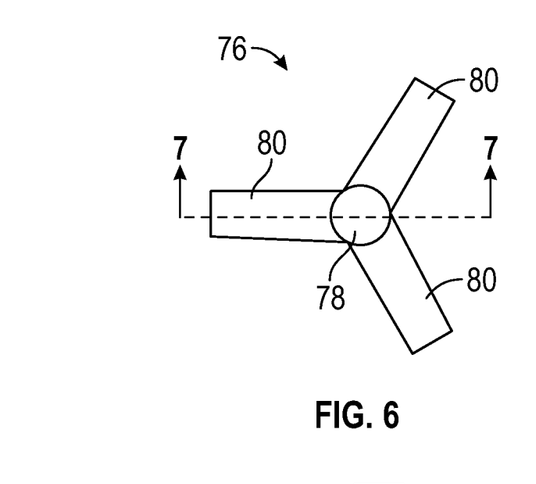
FIG. 6 is a top plan view of a tension leg FOWT platform having a third embodiment of the improved TMD system in accordance with this invention.
Figure 7:
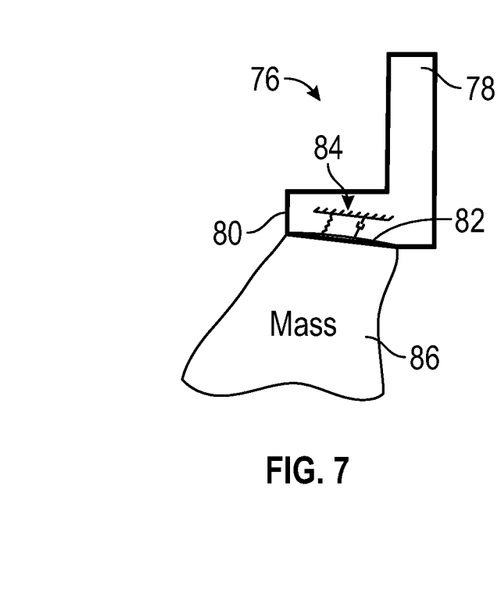
FIG. 7 is a cross-sectional view taken along the line 7-7 of FIG. 6.

FIGS. 6 and 7 illustrated a tension leg FOWT platform 76 having a third embodiment of the improved TMD system, shown schematically at 84. The tension leg FOWT platform 76 includes three buoyant beams 80, and a vertical center column 78 at a center of the FOWT platform 76. A flexible and water impermeable diaphragm 82 is formed in a lower surface of each beam 80 and is in contact with water 86 in which the tension leg FOWT platform 76 is deployed. As illustrated in FIG. 7, the TMD system 84 includes the diaphragm 82 and a pressure chamber having an orifice damper 84. In lieu of a water chamber, the water 86 acting against the diaphragm 82 functions as the mass for the TMD 84. The diaphragm 82 is movable in response to air pressure in the pressure chamber 84. In the illustrated embodiment, each of the beams 80 has a vertically oriented TMD system 84 therein.

Figure 8:
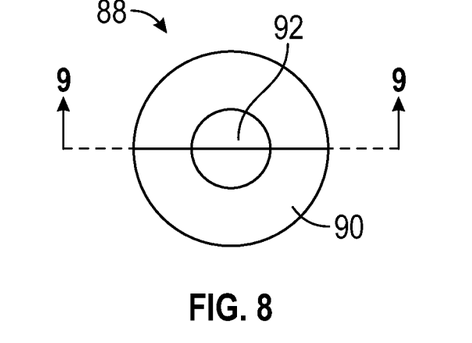
FIG. 8 is a top plan view of a spar type FOWT platform having a fourth embodiment of the improved TMD system in accordance with this invention.
Figure 9:
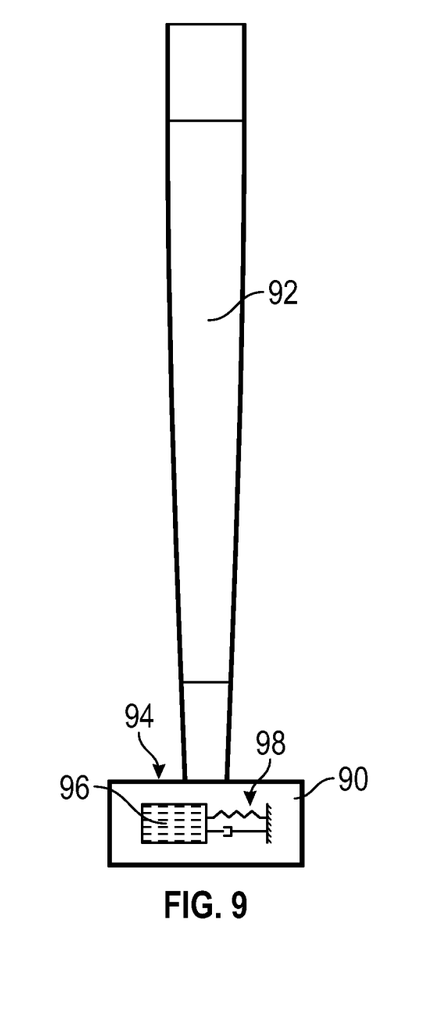
FIG. 9 is a cross-sectional view taken along the line 8-8 of FIG. 9.

FIGS. 8 and 9 illustrate a spar type FOWT platform 86 having a fourth embodiment of the improved TMD system, shown schematically at 94. The spar type FOWT platform 86 includes a base 90 and a vertical mast 92 extending outwardly and upwardly therefrom. As illustrated in FIG. 9, the TMD system 94 is substantially the same as the TMD system 70 and includes a water chamber 96 and a pressure chamber having an orifice damper 98. In the illustrated embodiment, TMD system 94 is horizontally oriented within the base 90.

Figure 10:
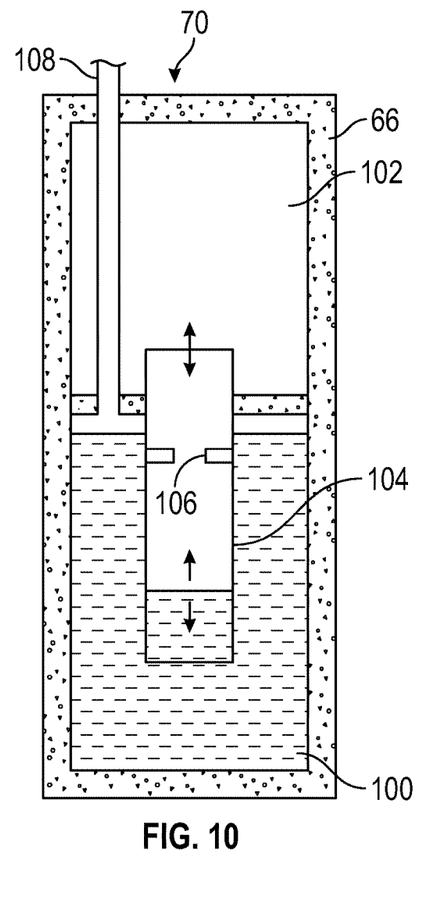
FIG. 10 is an enlarged cross-sectional view of the second embodiment of the improved TMD system shown in FIGS. 4 and 5.

Referring now to FIG. 10, one example of the TMD system 70 is shown. The TMD system 70 is shown within a vertical outer column 66. It will be understood however, that the TMD system 70 may be formed in any of the beams 64 and the vertical center column 68. The TMD system 70 includes a ballast water chamber 100 and pressure chamber 102. A damper pipe 104 extends between the ballast water chamber 100 and the pressure chamber 102 and has an orifice defining an orifice damper 106 formed therein for controlling an amount of pressurized air within the damper pipe 104. The damper pipe 104 may have a diameter within the range of about 1 m to about 20 m.

A ventilation pipe 108 extends between the ballast water chamber 100 and the atmosphere outside of the column 66, thus venting the ballast water chamber 100 with atmosphere.

Figure 11:
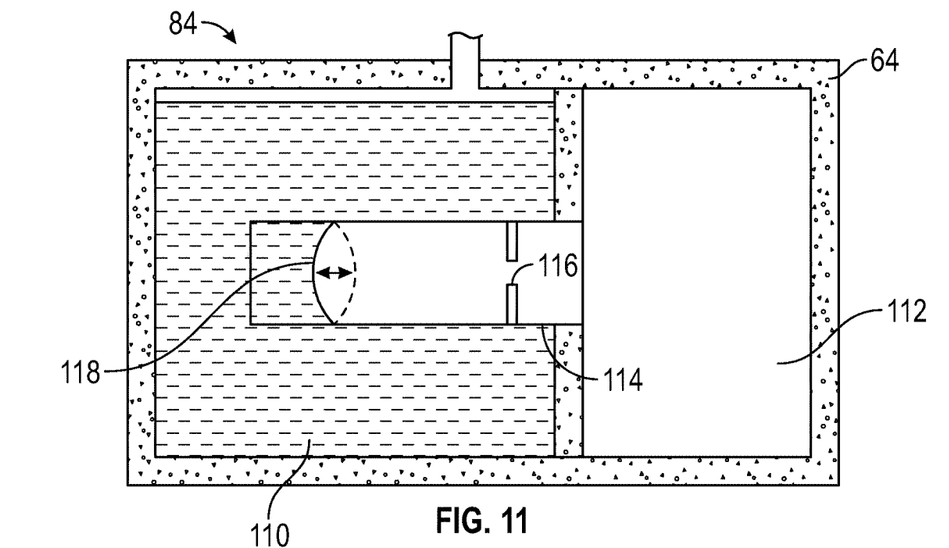
FIG. 11 is an enlarged cross-sectional view of the third embodiment of the improved TMD system shown in FIGS. 6 and 7.

Referring now to FIG. 11, one example of the TMD system 84 is shown. The TMD system 84 is shown within a horizontal beam 64 of the semi-submersible FOWT platform 62. It will be understood however, that the TMD system 84 may also be formed in the base 90 of the TMD system 94. The TMD system 84 includes a ballast water chamber 110 and pressure chamber 112. A damper pipe 114 extends between the ballast water chamber 110 and the pressure chamber 112 and has an orifice defining an orifice damper 116 formed in a first end thereof (the right-most end when viewing FIG. 11) for controlling an amount of pressurized air within the damper pipe 114. A flexible and water impermeable diaphragm 118 is formed in the damper pipe 114 near a second end thereof (the left-most end when viewing FIG. 11). The diaphragm 118 is movable against a force exerted by the water in the damper pipe 114 in response to air pressure in the damper pipe 114. The damper pipe 114 may have a diameter within the range of about 1 m to about 20 m.

Figure 12:
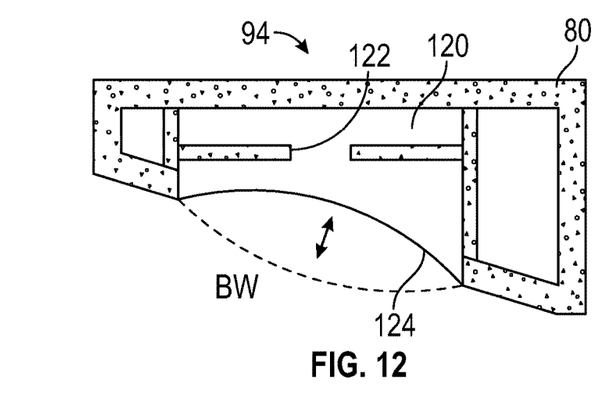
FIG. 12 is an enlarged cross-sectional view of the fourth embodiment of the improved TMD system shown in FIGS. 8 and 9.

Referring now to FIG. 12, one example of the TMD system 94 is shown. The TMD system 94 is shown within a beam 80 of the tension leg FOWT platform 76. The TMD system 94 includes pressure chamber 120 having an orifice defining an orifice damper 122 formed therein controlling an amount of pressurized air within the pressure chamber 120. A flexible and water impermeable diaphragm 124 is formed one end of the pressure chamber 120 and separates the pressure chamber 120 from the water outside of the beam 80. The diaphragm 124 is movable against a force exerted by the water in the body of water BW in response to air pressure in the pressure chamber 120.

Although described in the context of a tension leg FOWT platform, the TMD system 94 described herein may be configured to be used with any of the embodiments of the FOWT platforms described and illustrated herein.

Advantageously, any embodiment of the TMD system 34 described and illustrated herein may be used in targeting design-driving FOWT platform responses and characteristics that include, but are not limited to: (1) system heel angle, wherein the TMD system's dynamic heel angle is a typical design-driving criteria that impacts the robustness of the structural design in not only FOWTs, but floating offshore platforms in general. Implementing mass damper technologies, such as the TMD system 34 into the hull of a FOWT platform has been shown to decrease dynamic heel motion. Reduction in heel motion correlates with a reduction in both fatigue and ultimate loads for various structural components in the hull 12, the tower 14, and the wind turbine 16 mounted thereon; (2) system heave motion, wherein the use of a TMD in a FOWT platform will reduce the response to heave (vertical) motion of the platform. This may allow FOWT hulls to be designed with less concern with the turbine and environmental loading frequencies; (3) turbine harmonic forcing, wherein fatigue damage due to turbine harmonic loads associated with blade rotation is a prominent consideration in a wind turbine tower's design. Because such fatigue occurs at known frequencies, a TMD may be used for load mitigation and therefore improved fatigue performance, and (4) responses due to the wave environment, wherein TMDs within a FOWT platform hull may be set to target a wave frequency response and thus may mitigate dynamic and structural responses associated with waves.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A tuned mass damper (TMD) system in combination with a floating offshore wind turbine (FOWT) platform comprising:
    a barge FOWT platform having a hull configured to have a wind turbine tower mounted thereon; and
    a TMD system mounted in the hull, the TMD system having:
        a first TMD configured to operate at a first frequency; and
        a second TMD configured to operate at a second frequency different than the first frequency;
        wherein the first TMD includes a first water ballast chamber that defines a mass of the first TMD, and wherein the second TMD includes a second water ballast chamber that defines a mass of the second TMD.

2. The TMD system in combination with a FOWT platform according to claim 1, wherein at least one of the first and second TMDs is configured to mitigate at least one of heave motion, heel motion, turbine harmonic loading, and wave environment loading of the barge FOWT platform.

3. The TMD system in combination with a FOWT platform according to claim 2, wherein the TMD system further includes:
    a controller attached to the FOWT platform; and
    a sea state sensor mounted to the FOWT platform and operatively connected to the controller;
    wherein the controller is configured to actively control an operating frequency of the first and second TMDs based on input from the sea state sensor.

4. The TMD system in combination with a FOWT platform according to claim 3, wherein active control of the operating frequency of the first and second TMDs includes at least one of changing a stiffness of the first and second.

5. The TMD system in combination with a FOWT platform according to claim 3, wherein the first TMD is configured to at least one of mitigate heeling and reduce rotational movement of the hull.

6. The TMD system in combination with a FOWT platform according to claim 5, wherein the second TMD is configured to mitigate vertical motion of the hull.

7. The TMD system in combination with a FOWT platform according to claim 1, wherein at least one of the first and second TMDs is configured to allow the FOWT platform to effectively operate with rigid body heave and heel natural frequencies within an intended wave energy range.

8. A tuned mass damper (TMD) system in combination with a floating offshore wind turbine (FOWT) platform comprising:
    a FOWT platform having a center, at least three legs extending radially from the center, and configured to have a wind turbine tower mounted thereon; and
    a TMD system, a portion of which is mounted in each of the legs, each leg having:
        a first TMD at an outboard end of each leg and configured to operate at a first frequency; and
        a second TMD at an inboard end of each leg configured to operate at a second frequency different than the first frequency;
        wherein the first TMD includes a first water ballast chamber that defines a mass of the first TMD, and wherein the second TMD includes a second water ballast chamber that defines a mass of the second TMD.

9. The TMD system in combination with a FOWT platform according to claim 8, wherein at least one of the first and second TMDs is configured to mitigate at least one of heave motion, heel motion, turbine harmonic loading, and wave environment loading of the FOWT platform.

10. The TMD system in combination with a FOWT platform according to claim 8, wherein at least one of the first and second TMDs is configured to allow the FOWT platform to effectively operate with rigid body heave and heel natural frequencies within its intended wave energy range.

11. The TMD system in combination with a FOWT platform according to claim 8, wherein the FOWT platform is a barge platform having a hull comprising a keystone and four legs attached thereto and defining a cross shape.

12. The TMD system in combination with a FOWT platform according to claim 9, wherein at least one of the first and second TMDs is configured to mitigate at least one of heave motion, heel motion, turbine harmonic loading, and wave environment loading of the FOWT platform.

13. The TMD system in combination with a FOWT platform according to claim 12, wherein at least one of the first and second TMDs is configured to allow the FOWT platform to effectively operate with rigid body heave and heel natural frequencies within an intended wave energy range.

14. The TMD system in combination with a FOWT platform according to claim 8, wherein each first TMD further includes:
    a first pressure chamber within each leg connected to a source of pressurized air and a having an air pressure greater than atmospheric pressure;
    a first damper pipe having a closed first end and an open second end, the first end attached to an upper end of the first water ballast chamber, the first damper pipe extending toward a floor of the first water ballast chamber, such that the second end is spaced a distance apart from the floor of the first water ballast chamber; and
    a first connecting pipe extending between the first pressure chamber and an upper portion of the first damper pipe, the first connecting pipe configured for the flow of pressurized air therethrough.

15. The TMD system in combination with a FOWT platform according to claim 14, wherein each second TMD further includes:
    a second pressure chamber within each leg connected to a source of pressurized air and a having an air pressure greater than an air pressure within the first pressure chamber;
    a second damper pipe having a closed first end and on open second end, the first end attached to an upper end of the second water ballast chamber, the second damper pipe extending toward a floor of the second water ballast chamber, such that the second end is spaced a distance apart from the floor of the second water ballast chamber; and
    a second connecting pipe extending between the second pressure chamber and an upper portion of the second damper pipe, the second connecting pipe configured for the flow of pressurized air therethrough.

16. The TMD system in combination with a FOWT platform according to claim 15, wherein first connecting pipe and the second connecting pipe include an adjustable orifice, and wherein an inside diameter of the adjustable orifices are adjustable for active control of the flow of pressurized air from the first pressure chamber and the second pressure chamber, respectively.

17. A tuned mass damper (TMD) system in combination with a floating offshore wind turbine (FOWT) platform comprising:
   a semi-submersible FOWT platform having a center, at least three legs extending radially from the center, a center column, an outer column at a distal end of each of the at least three legs, and configured to have a wind turbine tower mounted on the center column; and
   a TMD system mounted in the FOWT platform and including a horizontally oriented first TMD mounted in each of the legs, and a vertically mounted second TMD mounted in each of the columns;
   wherein the first TMDs in each leg include a first water ballast chamber that defines a mass of the first TMD, and wherein the second TMDs in each column include a second water ballast chamber that defines a mass of the second TMD; and
   wherein each of the first and the second TMDs may be configured to operate at a different frequency.

18. The TMD system in combination with a FOWT platform according to claim 17, wherein at least one of the first and second TMDs is configured to mitigate at least one of heave motion, heel motion, turbine harmonic loading, and wave environment loading of the FOWT platform; and wherein at least one of the first and second TMDs is configured to allow the FOWT platform to effectively operate with rigid body heave and heel natural frequencies within its an intended wave energy range.

* * * * *